United States Patent
Asada (10) Patent No.: US 9,058,556 B2
(45) Date of Patent: Jun. 16, 2015

(54) RECORDING DEVICE, CONTROL METHOD, AND PROGRAM PRODUCT SPECIFYING SPECIFIC TEMPLATE AND PROCESS EXECUTED IN SPECIFIED TEMPLATE AREA

(71) Applicant: Seiko Epson Corporation, Tokyo (JP)

(72) Inventor: Kenji Asada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/019,870

(22) Filed: Sep. 6, 2013

(65) Prior Publication Data

US 2014/0071467 A1    Mar. 13, 2014

(30) Foreign Application Priority Data

Sep. 7, 2012  (JP) ................. 2012-197266

(51) Int. Cl.
- H04N 1/387 (2006.01)
- G06K 15/02 (2006.01)
- G06F 3/12 (2006.01)
- G06T 11/60 (2006.01)

(52) U.S. Cl.
CPC ........ G06K 15/1827 (2013.01); G06K 15/1872 (2013.01); G06K 15/186 (2013.01); G06K 15/1889 (2013.01)

(58) Field of Classification Search
None
See application file for complete search history.

(56) References Cited

U.S. PATENT DOCUMENTS

| | | | |
|---|---|---|---|
| 6,243,172 B1 * | 6/2001 | Gauthier et al. | 358/1.18 |
| 7,936,476 B2 * | 5/2011 | Kofman et al. | 358/1.18 |
| 8,446,636 B2 * | 5/2013 | Yamazaki | 358/1.9 |
| 8,736,864 B2 * | 5/2014 | Giess | 358/1.14 |
| 2011/0283578 A1 * | 11/2011 | Engelby et al. | 399/403 |
| 2014/0033011 A1 * | 1/2014 | Wandeler et al. | 715/222 |
| 2014/0071495 A1 * | 3/2014 | Asada | 358/1.18 |
| 2014/0146333 A1 * | 5/2014 | Shiohara et al. | 358/1.13 |

FOREIGN PATENT DOCUMENTS

| | | |
|---|---|---|
| JP | 2006-195666 A | 7/2006 |
| JP | 2006-221600 A | 8/2006 |
| JP | 2006-221601 A | 8/2006 |
| JP | 2012-048415 A | 3/2012 |

\* cited by examiner

*Primary Examiner* — Scott A Rogers
(74) *Attorney, Agent, or Firm* — Nutter McClennen & Fish LLP; John J. Penny, Jr.; Joshua I. Rudawitz (57) ABSTRACT

When a recording device dynamically changes the printout using the ability to record based on a template. A printer 3 has a storage unit 33 that stores a template database 35 defining areas that are formed in the recording area of a recording medium in a template, and a recording control unit 32 that records in the areas of the template based on the content of the template database 35 when a control command specifying a template and instructing recording in an area is received from a host computer 2. When a control command instructing recording a specific string in a specific area of a specific template is received, the recording control unit 32 also executes a specific process.

5 Claims, 9 Drawing Sheets

| Template Name | Field Name | Field Reference Coordinates | Size | Default Image Information | | Border Information | Background Information | Field Attribute |
|---|---|---|---|---|---|---|---|---|
| | | D3 | D4 | Image Reference Coordinates (D51) | Recording Image Information (D52) | D6 | D7 | D8 |
| Template T1 | Field A1 | (X1, Y1) | (W1, H1) | | | BLACK | NONE | ADDRESS |
| | Field A2 | (X2, Y2) | (W2, H2) | | | BLACK | NONE | REGION INFORMATION |
| | Field A3 | (X3, Y3) | (W3, H3) | | | BLACK | NONE | DELIVERY METHOD |
| | Field A4 | (X4, Y4) | (W4, H4) | | | BLACK | NONE | BARCODE |
| | Field A5 | (X5, Y5) | (W5, H5) | (x5, y5) | 'BLLING: P/P' FONT SIZE (fa1) | BLACK | NONE | RELATED INFORMATION |
| | Field A6 | (X6, Y6) | (W6, H6) | | | BLACK | NONE | FREE AREA |

RECORDING DEVICE, CONTROL METHOD, AND PROGRAM PRODUCT SPECIFYING SPECIFIC TEMPLATE AND PROCESS EXECUTED IN SPECIFIED TEMPLATE AREA

Priority is claimed under 35 U.S.C. §119 to Japanese Application nos. 2012-197266 filed on September 7, which is hereby incorporated by reference in their entirety.

BACKGROUND

1. Technical Field

The present disclosure relates to a recording device that records based on a template, to a method of controlling the recording device, and to a storage medium storing a program for controlling the recording device.

2. Related Art

Recording devices that record using predefined templates in a system that uses a recording device are known from the literature. See, for example, Japanese Unexamined Patent Appl. Pub. JP-A-2012-048415. This type of recording device records according to a template based on control commands input from a control device.

Recording devices that can record based on a template and can use this ability to record based on a template to dynamically change the printout are desirable in order to further improve user convenience.

SUMMARY

The present disclosure uses the ability to record based on a template to dynamically change the printout.

One aspect of the disclosure is a recording device that can connect to a control device, the recording device including: a storage unit that stores template data defining areas formed in the recording area of a recording medium based on a template; and a recording control unit that, when a control command specifying a specific template and instructing recording in a specific area is received from the control device, records in the area based on the template data related to the specific template, and executes a specific process when a control command specifying recording a specific string in a specific area of a specific template is received.

Because the recording device according to this aspect of the disclosure executes a specific process when recording a specific string in a specific area of a specific template is commanded, the printout can be dynamically changed based on the relationship of the area defined in the template and the string recorded in the area. More specifically, the printout can be dynamically changed using the ability to record based on a template.

In a recording device according to another aspect of the disclosure, execution process data relating area identification information specifying an area, a specific string, and execution process information identifying a specific process to execute when recording a specific string in an area identified by the area identification information is instructed is stored in the storage unit; and when a control command is received from the control device, the recording control unit determines based on the execution process data if recording a specific string in the area identified by the area identification information is instructed, and if said recording is instructed, executes the specific process indicated by the corresponding execution process information.

In this aspect of the disclosure, the recording device can appropriately determine based on the execution process data if recording a specific string in a specific area is commanded, and based on the result of this decision can appropriately execute a specific process.

The execution process data may be data different from the template data, or data contained in the template data.

In a recording device according to another aspect of the disclosure, area attribute information indicating an attribute of an area is related instead of the area identification information or in addition to the area identification information to the specific string and execution process information in the execution process data; and the recording control unit determines, based on the execution process data when a control command is received from the control device, if recording a specific string in the area identified by the area identification information is instructed, if recording a specific string in the area with the attribute indicated by the area attribute information is instructed, or if recording a specific string in the area that is identified by the area identification information and has the attribute indicated by the area attribute information is instructed, and if recording a specific string is instructed, executes the specific process indicated by the related execution process information.

Because areas (fields) in the template have an attribute, the meaning of the string recorded in a particular area may differ according to the attribute of the area. This aspect of the disclosure can dynamically change the printout based on the relationship of the areas defined in the template, the area attributes, and the string recorded in a particular area. More specifically, the printout can be dynamically changed using the ability to record based on a template.

In a recording device according to another aspect of the disclosure, the specific process is at least one of a process that changes the color of a border around the specific area, a process that changes the color of the background of the specific area, a process that changes the color of the specific string, a process that adds a specific image to the specific area, a process that adds a specific string to the specific area, and a process that makes a specific part of the specific area a specific color.

Using the areas (fields) formed in the recording area of the recording medium, this aspect of the disclosure can execute a process that improves user convenience at the appropriate time.

Another aspect of the disclosure is a control method of a recording device that can connect to a control device, including steps of: storing template data defining areas formed in the recording area of a recording medium based on a template; and recording in the specific area based on the template data related to the specific template when a control command specifying a specific template and instructing recording in a specific area is received from the control device; and executing a specific process when recording a specific string in a specific area of a specific template is instructed.

Because the recording device according to this aspect of the disclosure executes a specific process when recording a specific string in a specific area of a specific template is commanded, the printout can be dynamically changed based on the relationship of the area defined in the template and the string recorded in the area. More specifically, the printout can be dynamically changed using the ability to record based on a template.

Another aspect of the disclosure is a storage medium storing a program executed by a control unit that controls a recording device that can connect to a control device and has a storage unit that stores template data defining areas formed in the recording area of a recording medium based on a template, the program causing the control unit to function as a recording control unit that: records in the specific area based on the template data related to the specific template when a control command specifying a specific template and instructing recording in a specific area is received from the control device; and executes a specific process when recording a specific string in a specific area of a specific template is instructed.

By executing this program, the recording device executes a specific process when recording a specific string in a specific area of a specific template is commanded, and can the dynamically change the printout based on the relationship of the area defined in the template and the string recorded in the area. More specifically, the recording device can dynamically change the printout using the ability to record based on a template.

Effect of the Disclosure

The disclosure enables dynamically changing the printout using the ability to record based on a template.

Other objects and attainments together with a fuller understanding of the disclosure will become apparent and appreciated by referring to the following description and claims taken in conjunction with the accompanying drawings.

DESCRIPTION OF EMBODIMENTS

Preferred embodiments of the present disclosure are described below with reference to the accompanying figures.

Embodiment 1

Figure 1:
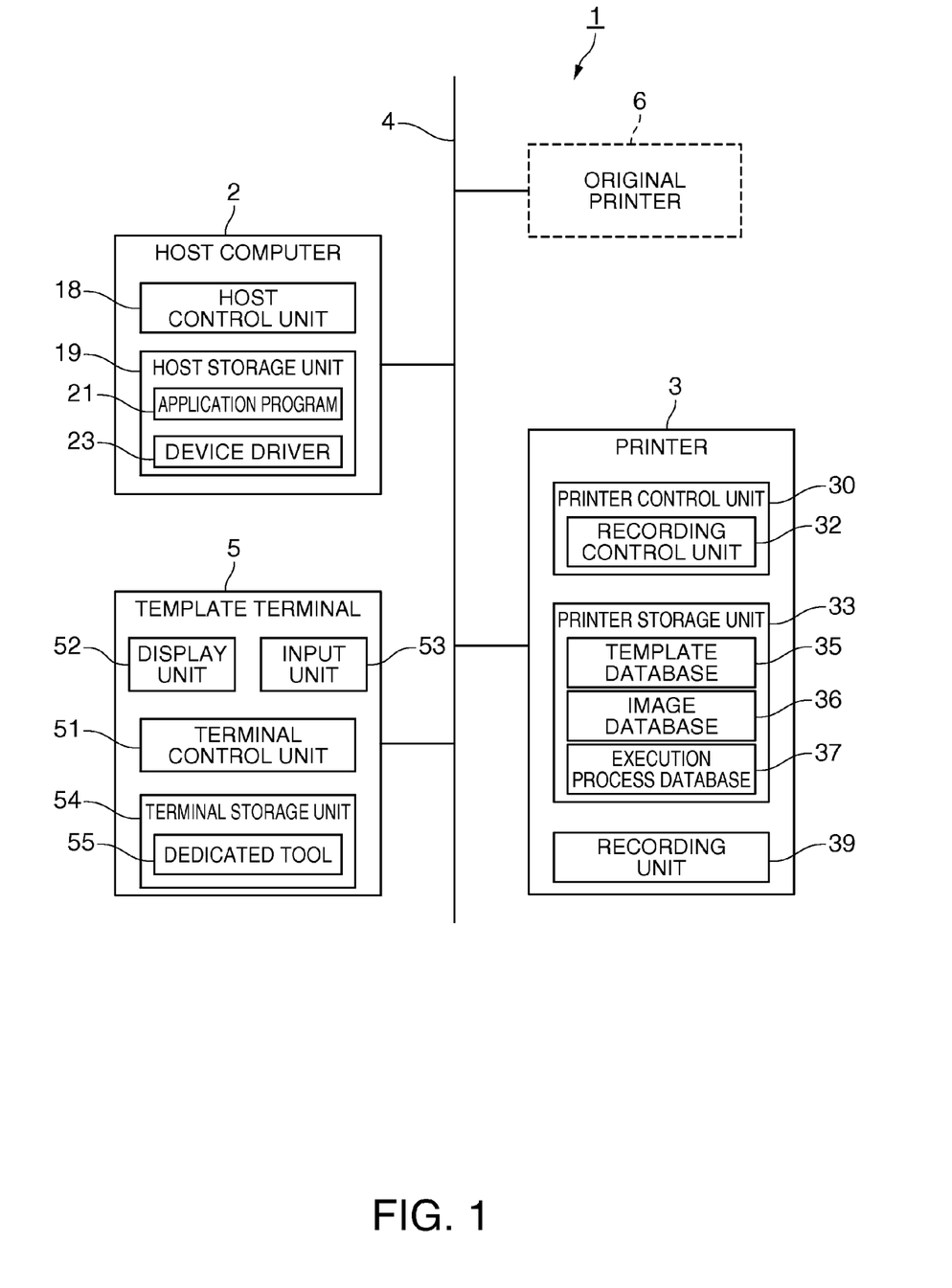
FIG. 1 is a block diagram showing the configuration of a recording system according to a first embodiment of the disclosure.

FIG. 1 is a function block diagram showing the configuration of a recording system 1 according to a preferred embodiment of the disclosure.

As shown in FIG. 1, a recording system 1 according to this embodiment of the disclosure includes a host computer 2 (control device) and a printer 3 (recording device) that connects to the host computer 2 through a network 4 and records images on a recording medium as controlled by the host computer 2. More specifically, label paper having precut adhesive labels of a specific size affixed on a continuous backer is loaded into the printer 3, and the printer 3 records an image based on a template to a label affixed to the backer.

The network 4 is a wired LAN or wireless LAN network conforming to a specific standard such as Ethernet (R). Network devices using the USB or RS-232C protocol may also be connected to the network 4.

Before the printer 3 according to this embodiment of the disclosure is connected to the host computer 2, a different (first) printer 6 was connected and the host computer 2 controlled the original printer 6 to record images on the labels based on a template. The original printer 6 in this embodiment is a monochrome printer, and the printer 3 according to this embodiment of the disclosure (also referred to below as a replacement printer 3 for convenience) is a color printer.

An object of the disclosure is to provide a recording system 1 that enables: (1) recording images on labels using the replacement printer 3, and smoothly changing from the original printer 6 to the replacement printer 3, without changing the control commands that are output by the host computer 2 before and after replacing the original printer 6 with the replacement printer 3, that is, without changing the software installed on the host computer 2; (2) desirably colorizing the printout using the ability of the replacement printer 3 to print in color; and (3) dynamically changing the output of the printed labels to assure variety in the printout, increase the value of the replacement printer 3, and improve the convenience of the user reading the label.

As shown in FIG. 1, a template terminal 5 described below can also connect to the network 4.

The host computer 2 includes a host control unit 18 and a host storage unit 19.

The host control unit 18 includes CPU, RAM, ROM, and other peripheral circuits, and centrally controls parts of the host computer 2.

The host storage unit 19 includes memory that stores data nonvolatilely, and stores at least an application program 21 and a device driver 23.

To record an image on a label with the printer 3, the application program 21 generates and outputs information related to the image to be recorded on the label ("label image information" below) to the device driver 23.

The device driver 23 is a program for controlling the original printer 6, and is written according to the hardware and software specifications of the original printer 6. When label image information is input from the application program 21, the device driver 23 generates and outputs control commands written in the command language used to control the original printer 6 to the printer 3. Using the method described below, the printer 3 records an image on a label according to the template based on the control commands written in the command set of the original printer 6.

The printer 3 has a recording unit 39 including hardware such as a recording head and conveyance rollers for recording images, and a controller that controls the hardware, and the recording unit 39 records an image on a label of the label paper.

The printer 3 has a printer control unit 30 including CPU, RAM, and ROM, and centrally controls parts of the printer 3. The printer control unit 30 includes a recording control unit 32 that, when a control command in the command set of the original printer 6 is received from the host computer 2, interprets the control command and records the image with the recording unit 39. The function of the recording control unit 32 is achieved by the cooperation of hardware and software, such as the CPU of the control unit 30 reading and running a firmware program.

The printer 3 also has a storage unit 33 that nonvolatilely stores a program and data. A template database 35 (template data), an image database 36, and an execution process database 37 (execution process data) as further described below are stored in the storage area of the printer storage unit 33.

The template terminal 5 includes a terminal control unit 51, display unit 52, input unit 53, and terminal storage unit 54.

The terminal control unit 51 includes CPU, ROM, RAM, and controls the template terminal 5.

The display unit 52 has an LCD panel or other display panel, and displays information on the display panel as controlled by the terminal control unit 51.

The input unit 53 is an input device such as a mouse or keyboard, detects operation of the input device, and outputs to the terminal control unit 51.

The terminal storage unit 54 includes a hard disk drive or other nonvolatile memory device, and stores data nonvolatilely. A dedicated tool 55, which is a software tool, is installed to the template terminal 5. The terminal control unit 51 executes the processes described below using a function of the dedicated tool 55.

The printer 3 according to this embodiment of the disclosure records an image on a label according to a template as controlled by the host computer 2.

A template is information describing rules for recording an image in the recording area of the label, and in this embodiment includes the layout (pattern) of fields (areas) that can be printed in the recording area of the label. The recording area of a label is the maximum size of the space in which images can be recorded (dots can be placed) on one label. The recording area is segmented into fields (areas) according to the content of the image (information) to be recorded. Plural templates with different layouts of fields in the recording area are prepared in advance in this embodiment, and the printer 3 can record images on labels based on any one of the templates.

Figure 2:
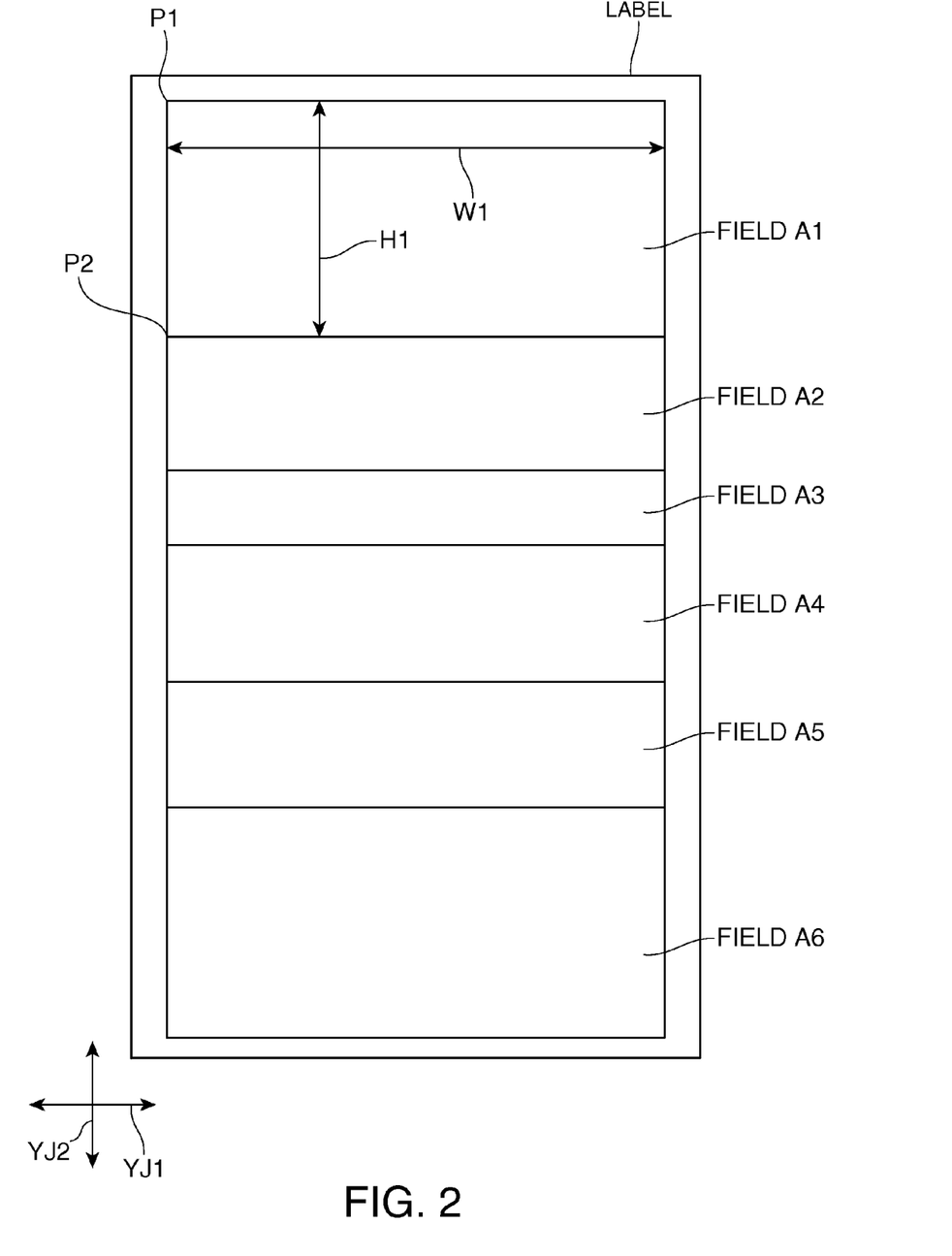
FIG. 2 shows an example of an image related to a template.

FIG. 2 shows template T1, which is one of the plural preconfigured templates. As shown in FIG. 2, the template T1 has six rectangular fields, fields A1 to A6, formed sequentially from top to bottom.

This template T1 is a template for labels that are applied to packages or packaging by package shipping companies to identify individual packages.

The information related to each field in the template is defined in a template database 35.

Figure 3:
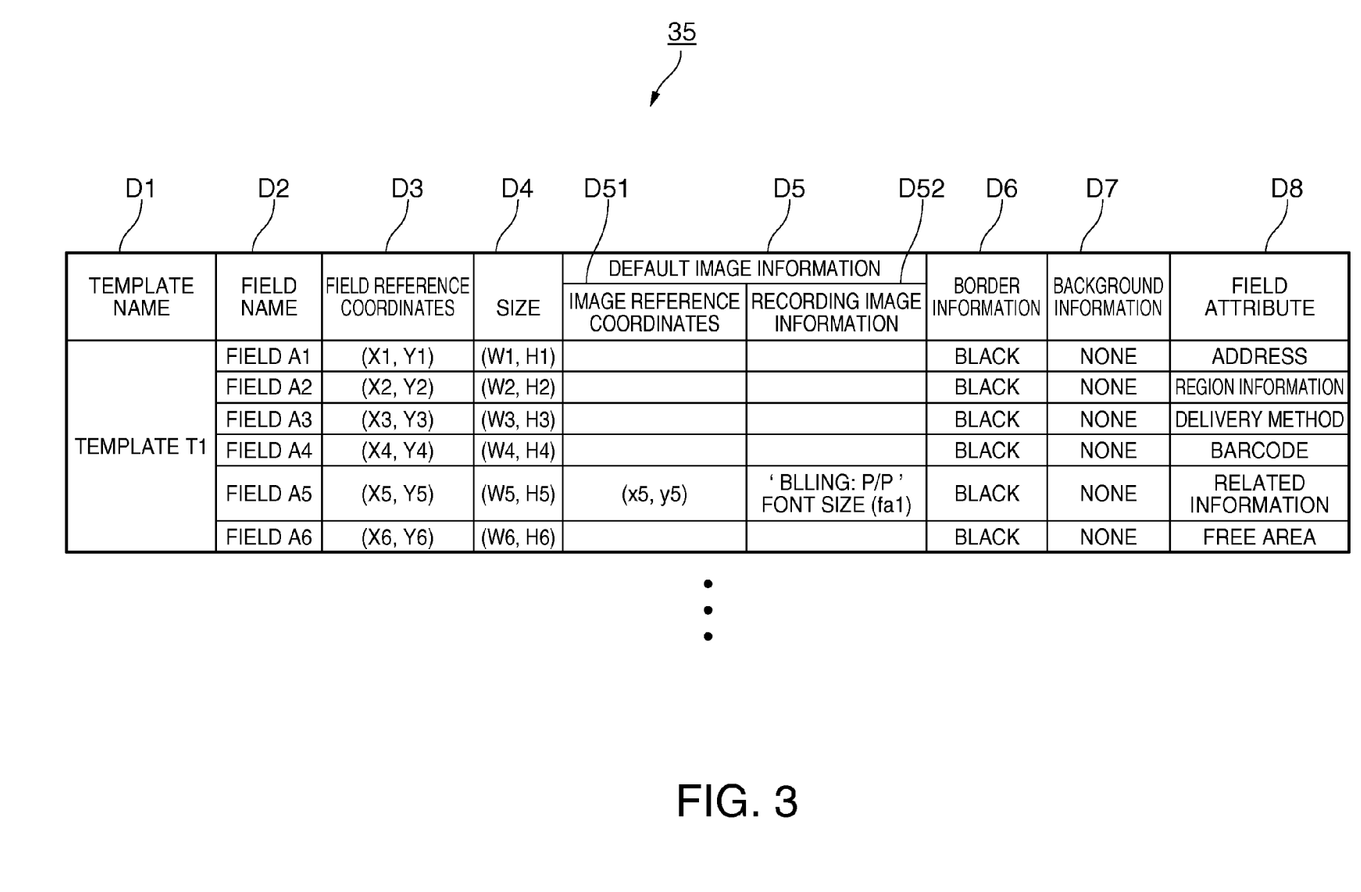
FIG. 3 shows the data structure of a template database.

FIG. 3 shows an example of the data structure of the template database 35. FIG. 3 shows the record for the template T1 shown in FIG. 2. The template database in the example in FIG. 3 is a relational database, but the template database is not so limited.

The template name D1 field contains the name (identifier) uniquely assigned to the template.

The field name D2 fields (field identification information identifying a particular field in the template) contain the names (identification information) of the fields included in the template. As shown in FIG. 2, template T1 has six fields A1 to A6. As shown in FIG. 3, the template database 35 therefore contains six field records, one for each of the six fields A1 to A6, related to template T1, and each record stores an appropriate name in the field name D2 field.

The field reference coordinates D3 field contains the coordinates of a reference point for the field in a coordinate system of which the origin is a specific position in the recording area of the label. Any desired position in the recording area of the label can be specified using coordinates in this coordinate system. In this embodiment, the shape of each field in the recording area is a rectangle having two sides parallel to the short axis YJ1 of the label, and two sides parallel to the long axis YJ2, as shown in FIG. 2. The origin of a field denotes a specific one of the four vertices of the field border. As indicated by vertex P1 of field A1 in FIG. 2 and vertex P2 of field A2 in FIG. 2, the vertex at the top left of the four corners of each border is the origin in this embodiment.

The size D4 field contains information indicating the length W of the field on the short axis YJ1, and the length H of the field on long axis YJ2. For example, information denoting length W1 and length H1 is stored as the size D4 of field A1 in FIG. 2. Because the fields are rectangular as described above, the position, shape, and size of each field in the recording area can be uniquely determined using the field reference coordinates D3 and the size D4 fields.

The default image information D5 field contains information related to the image ("default image" below) that is recorded in the corresponding field independently of an instruction from the host computer 2. The default image information D5 field includes image reference coordinates D51 and recording image information D52 fields. The image reference coordinates D51 field contains the coordinates of the origin of the default image in the above coordinate system. The recording image information D52 field contains information about the default image to be recorded.

For example, the string BILLING:P/P is recorded as the default image at the specified position in field A5 in FIG. 2. In this instance as shown in the recording image information D52 field for field A5 in FIG. 3, the information needed to identify the default image, such as information identifying the string and information identifying the font size of the string, is stored in the recording image information D52 field. Bitmap data or other image data can also be stored (registered) in the storage unit 33, and the recording image information D52 can therefore be information representing previously stored image data as the default image.

The border information D6 field contains information describing the color of the border around the area. The printer 3 in this embodiment is a color printer, a border color can be specified for each field, and the border will be recorded on the label in the specified color. Note that the color of the border or the background described below can also be set to "none," that is, the border is not recorded or color is not added to the background described below.

The background information D7 field contains information identifying the color of the background in the field. When the printer 3 is a color printer, a background color can be specified for each field. For example, if information indicating blue is stored in the background information D7, the entire corresponding field will be printed blue.

The field attribute D8 field contains information about a specific field attribute. A field attribute is information expressing a feature, characteristic, or content, for example, of the image (information) recorded in the corresponding field.

As described above, template T1 is a template for a label affixed to a shipping package, field A1 in template T1 is the field where the address of the recipient and shipper is recorded, and the attribute for field A1 is "address." Field A2 is the field where a code or other information representing the region of the package destination is recorded, and the attribute of this field is "region." Field A3 is the field for recording information identifying the shipping method used to ship the package, and the attribute is "shipping method." Field A4 is where a barcode used by a particular process, such as a barcode for identifying the package, is recorded, and the attribute is "barcode." Field A5 is where other necessary information is recorded, and the attribute is set to "related information." Field A6 is a free field for recording other information, such as advertising, and the attribute is "memo."

The terminal control unit 51 of the template terminal 5 has a function for generating the records in the template database 35 based on information stored in a template by the original printer 6. A corresponding record is therefore created in the template database 35 for each template that can be used by the original printer 6, and the new printer 3 can record images based on the templates used by the original printer 6.

More specifically, data in a specific format (the "original template data" below) including at least the template name, the name of each field in the template, location and size information for each field, and information about any default image to be recorded in each field is stored for each template that can be used by the original printer 6. For example, the original template data for the template on which template T1 is based includes at least template T1 as the template name, fields A1 to A3 as the field names, information denoting the position and size of each of the fields A1 to A3, and information related to the default image to be recorded in field A5.

The terminal control unit 51 of the template terminal 5 communicates over the network 4 with the original printer 6 and requests transmission of the original template data. In response to this request, the original printer 6 sends the original template data to the template terminal 5.

The terminal control unit 51 communicates with the printer 3 over the network 4, and generates records for a template in the template database 35 based on the original template data received from the original printer 6.

The terminal control unit 51 stores the name of the template in the original template data in the template name D1 field of the template database 35, and stores the names of the template fields contained in the original template data in the field name D2 fields, for each generated record. The template name stored in the template name D1 field and the field names stored in the field name D2 fields of the template record created in the template database 35 stored by the printer 3 for a template that was used by the original printer 6 are therefore the same as the template name and field names of the original template.

For each field in the template, the terminal control unit 51 calculates the field reference coordinates D3 and size D4 based on the field position and size information contained in the original template data, and stores the calculated values in the field reference coordinates D3 and size D4 fields of the generated database record.

Note that the dedicated tool 55 also contains a program with an algorithm for outputting the field reference coordinates D3 and size D4 information based on the input field position and size information contained in the original template data, and calculates the field reference coordinates D3 and size D4 information for each field using this program function.

For each template field, the terminal control unit 51 also generates default image information D5 based on information related to default images contained in the original template data, and stores the generated default image information D5 in the default image information D5 fields of the template database 35. This process is controlled by a function of a dedicated program.

After storing appropriate information in the corresponding template name D1, field name D2, field reference coordinates D3, size D4, and default image information D5 fields of the record generated for each field contained in a template, the terminal control unit 51 stores corresponding default values in the border information D6, background information D7, and field attribute D8 fields. The default values to be stored can be predefined by the user.

The terminal control unit 51 of the template terminal 5 can also update specific information in specific records of the template database as instructed by the user. More specifically, the dedicated tool 55 also has a function for communicating with the control unit 30 of the printer 3, accessing the template database stored in the printer storage unit 33, and acquiring content therefrom, and a function for displaying the content from the template database 35 on the display panel together with a user interface enabling the user to update specific information in a specific record. The user can refer to the user interface on the display panel and operate an input device of the input unit 53 to update specific information.

The user can therefore set the color of the border around a specific area to red, or the back of a specific area to blue, for example, and thereby use the ability of the printer 3 to print color to desirably colorize the printout. The user interface also has fields for selectively inputting template field attributes, and the user can selectively update the field attribute D8 fields of the template database 35. As many selectable field attributes as needed are provided.

The basic operation of the host computer 2 and printer 3 when recording an image on a label according to a template is described next.

As described above, to record an image on a label, the application program 21 of the host computer 2 first generates and outputs label image information to the device driver 23. Based on the label image information, the device driver 23 then generates and outputs a control command instructing recording an image on a label to the printer 3.

This control command is a command in the command set of the original printer 6, and includes information specifying the name of the template to use, and related information for each field in the template specifying the name of the field and the image to be recorded in the field identified by the field name. When the image to be recorded in a template field is a text string, information expressing the string as a combination of specific character codes is included in the information related to the image to be recorded in the template field.

When the control command is input, the recording control unit 32 of the printer 3 analyzes the control command and extracts the name of the specified template. As described above, the template names managed by the original printer 6 exactly match the names stored in the template name D1 field of the template database managed by the printer 3. The recording control unit 32 references the template database 35, and extracts the record storing the name of the extracted template in the template name D1 field. The extracted record is the record of the template to be used to record an image on the label. Based on the extracted record, the recording control unit 32 then records images in each field of the template while managing the position, shape, default image to be recorded, position, border color, and background color based on the field reference coordinates D3, size D4, default image information D5, border information D6, and background information D7 fields of each template field.

While recording, the recording control unit 32 analyzes the commands in the command set of the original printer 6 to manage the image and the position of the image to be recorded in each template field, and record the appropriate image specified by the control command in the appropriate position of each template field. Note that the firmware includes a function for analyzing control commands in the command set of the original printer 6.

Figure 4:
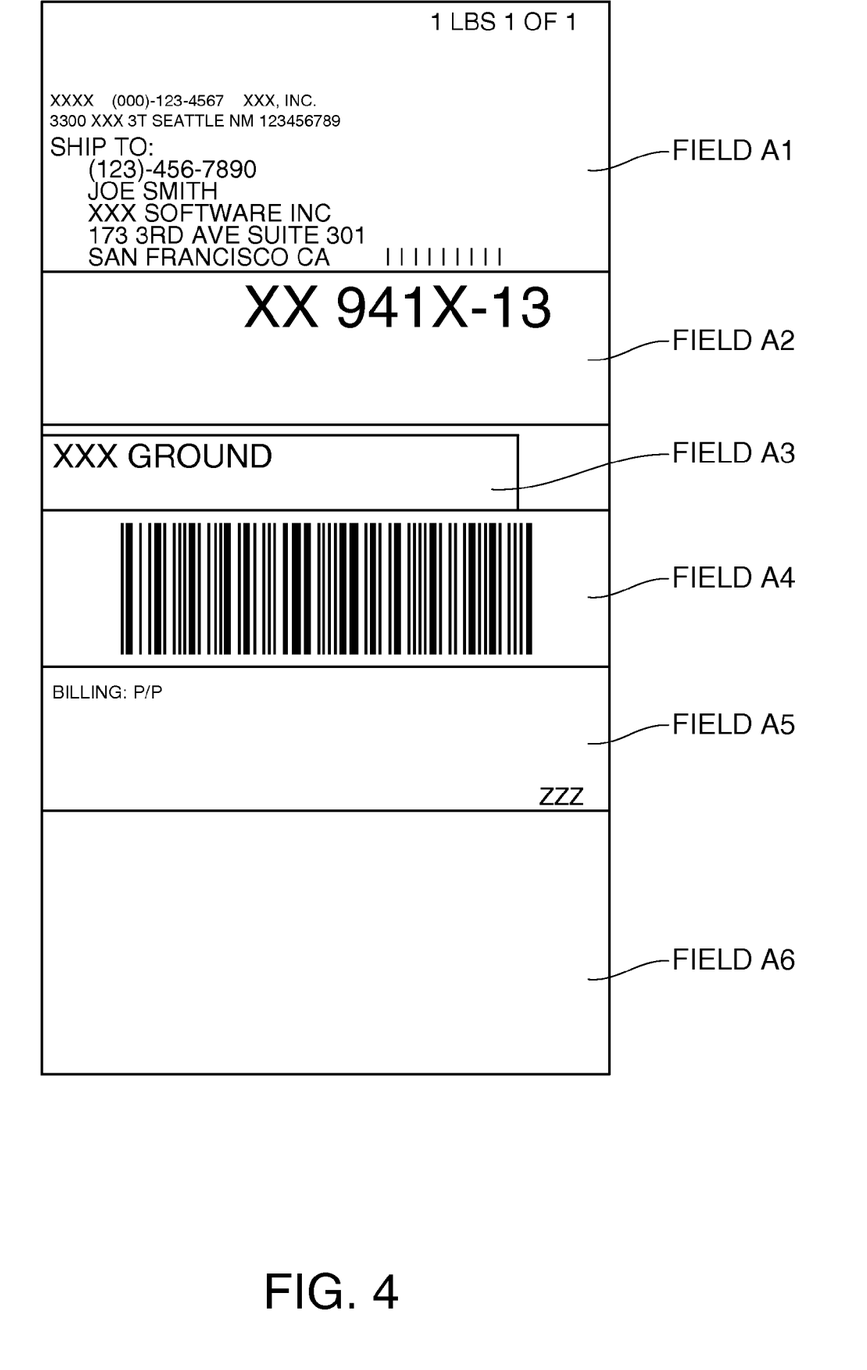
FIG. 4 shows an example of an image recorded by a control command.

FIG. 4 shows an example of a label on which images are recorded according to template T1.

In the example in FIG. 4, the recipient and shipper are recorded as a string in field A1. A code or other information identifying the region of the package destination is recorded as a string in field A2. Information identifying the shipping method used to ship the package is recorded as a string in field A3. A barcode identifying the package is recorded in field A4. A code identifying the advertiser of the advertising image recorded in field A6 is recorded as a string in field A5.

The template terminal 5 in this embodiment of the disclosure thus acquires required information related to a template from the original printer 6, and based on the acquired information generates records in the template database 35. The template identification information (template name) and identification information (field names) for each field in the template managed by the original printer 6 is thus the same as the information managed by the printer 3. As a result, the printer 3 can appropriately manage the template to use and the template fields, and record images to a label based on the template, using the control commands that are output to the original printer 6.

The printer 3 can also desirably colorize the field borders and field background, and record images using a template based on a template that was used by the original printer 6, without changing the control commands output from the host computer 2 to the original printer 6, that is, without modifying the application program 21 or device driver 23.

The printer 3 according to this embodiment of the disclosure can, however, dynamically change the label printout when a specific condition is met, and thereby vary the printout. More specifically, the printer 3 can produce dynamic printout by using the ability (1) to record images based on a template, and (2) print in color.

The operation of the printer 3 is described below.

Figure 5:
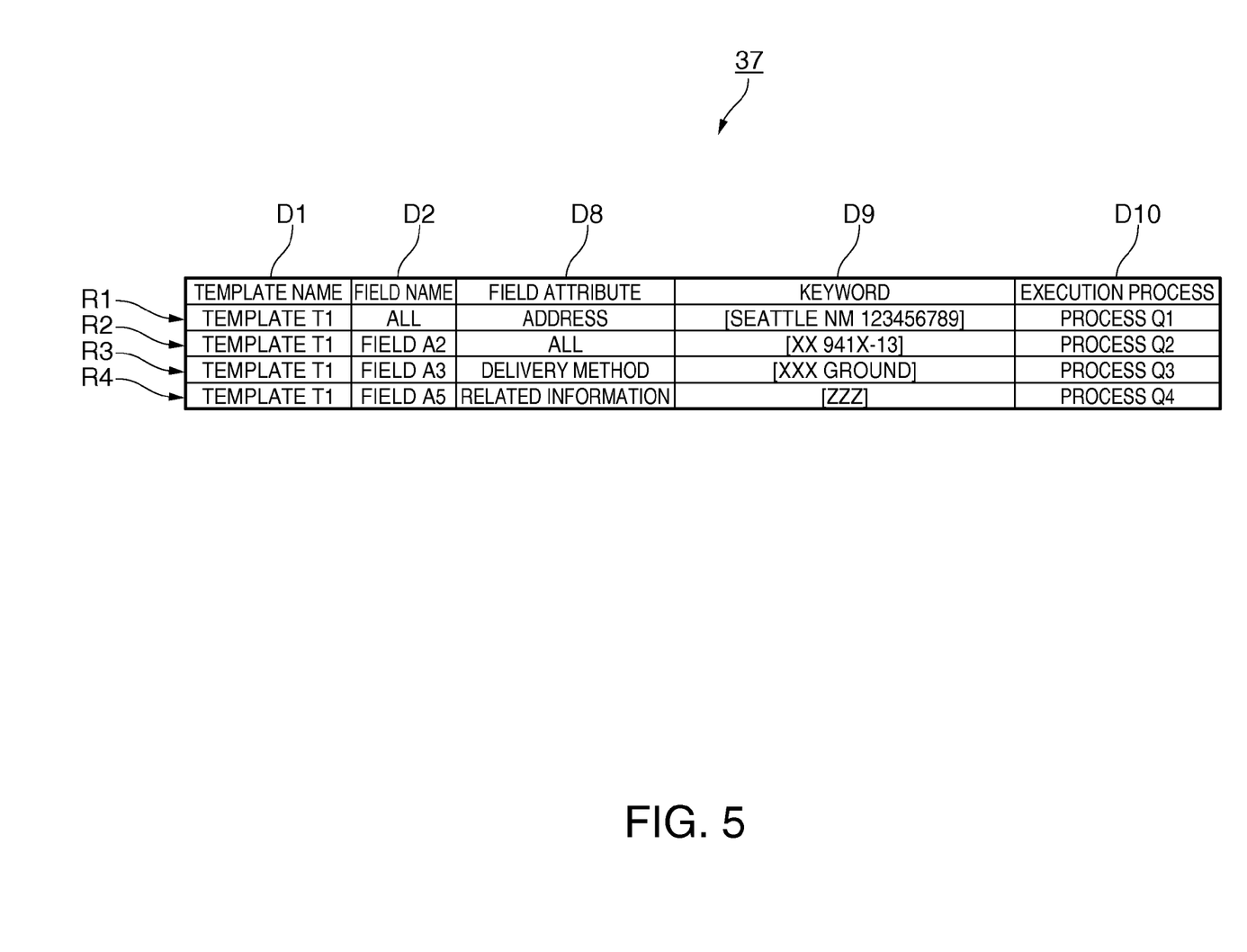
FIG. 5 shows the data structure of an execution process database.

FIG. 5 shows the data structure of an execution process database 37.

As shown in FIG. 5, each record of the execution process database 37 has template name D1, field name D2, field attribute D8, keyword D9, and execution process D10 fields.

When a specific condition, such as that a specific string is recorded in a specific field of a specific template, is met, the printer 3 according to this embodiment of the disclosure executes a specific recording process, and thereby dynamically changes the printout. The execution process database 37 is a database relationally storing this condition to the process to be executed when the condition is met. The relationship between the execution process database 37 and process executed when the condition is met is described below using FIG. 5 and FIG. 6 with reference to a specific example.

Note that the keyword D9 field stores a string corresponding to the specific string.

Figure 6:
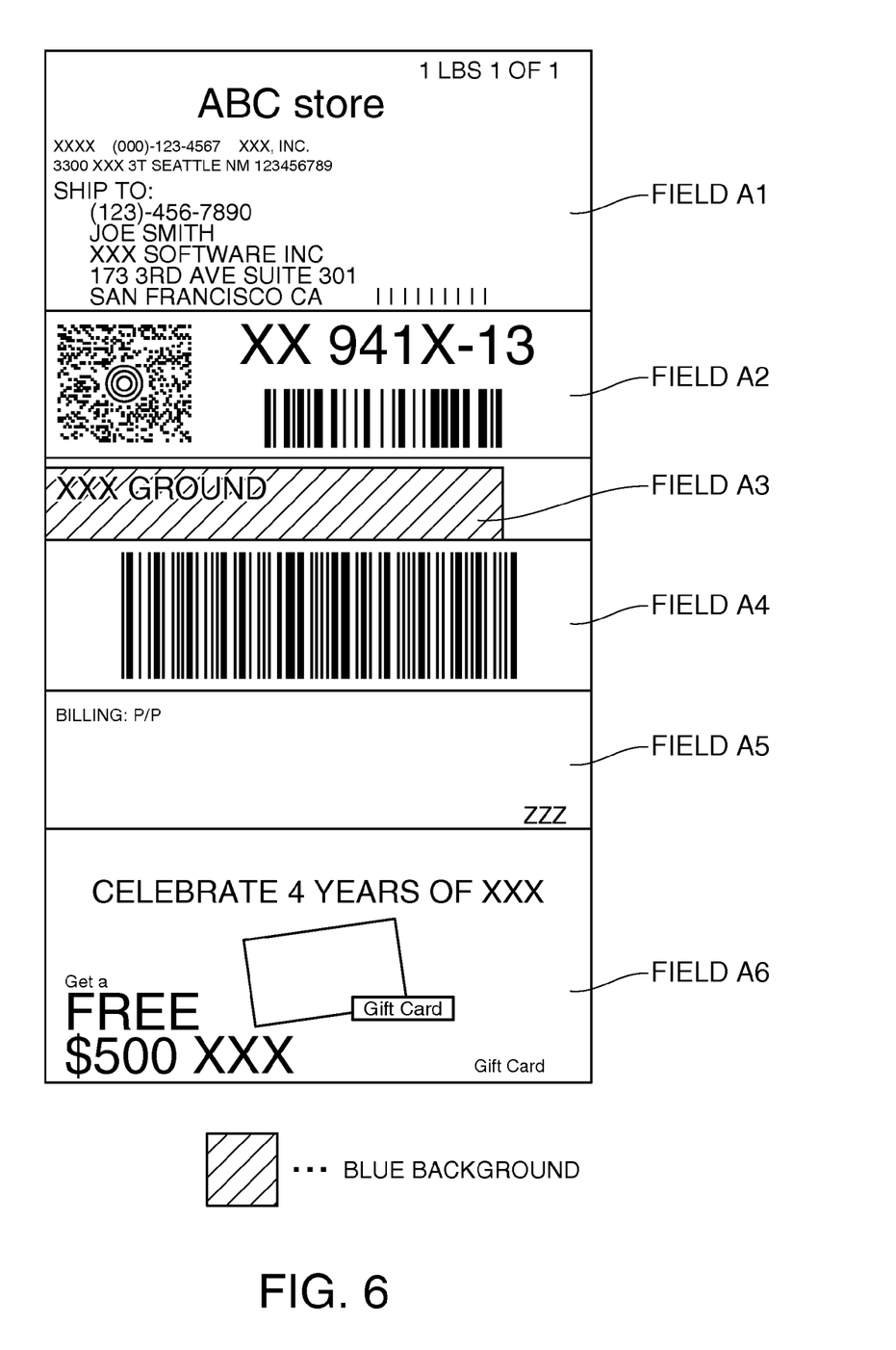
FIG. 6 shows an example of a dynamically changed image.

FIG. 6 shows examples of the images recorded on a label when executing processes based on the execution process database 37.

The images shown in FIG. 4 described above and the images shown in FIG. 6 are related. By running a process based on the execution process database 37, the printer 3 can receive the same control commands as the control commands instructing recording the images shown in FIG. 4, and record the images shown in FIG. 6.

As shown in FIG. 5, the first record R1 in the execution process database 37 stores the following values: template name D1, template T1; field name D2, ALL; field attribute D8, ADDRESS; keyword D9, SEATTLE NM 123456789; execution process D10, process Q1. Process Q1 is a process that records a stored image with a specific identification number at a specific position in the field for recording the string SEATTLE NM 123456789 stored as the keyword D9.

In this embodiment image data (such as bitmap data) for the desired image (stored image) can be previously stored in the image database 36 managed in the storage unit 33, and the image database 36 stores the image for the stored image linked to a unique identification number assigned to each stored image. The stored image related to process Q1 in this embodiment is an image containing a corporate logo with the address SEATTLE NM 123456789.

The field name D2 of ALL means that the field name D2 could be any name.

The combination of the template name D1, field name D2, field attribute D8, and keyword D9 in each record in the execution process database 37 defines a specific condition, and the execution process D10 identifies the process to be executed when the condition defined by this combination of data is met.

For example, record R1 means that when the control command instructs recording the string SEATTLE NM 123456789 in a field with the field attribute D8 of ADDRESS in template T1 regardless of the field name D2, process Q1 executes to record the image of the corporate logo with the address SEATTLE NM 123456789 at the specified position in the specified template field. By executing process Q1 triggered by this condition being met, the logo of the company at the specified address is recorded for the string representing the address as shown in field A1 in FIG. 6. The user reading the label can then know the company corresponding to the address, and user convenience is improved. As a result, the printer 3 can dynamically change the image printed in field A1.

When a control command is received from the host computer 2 the recording control unit 32 interprets the control command and references the execution process database 37, determines if the condition defined by each record in the database is met, and if the condition is met, executes the process stored in the corresponding execution process D10 field at the appropriate time. Using the example of record R1, the recording control unit 32 interprets the control command when a control command is received from the host computer 2, determines if the condition related to record R1 is met, and executes process Q1 if the condition is met.

As also described above, if the image to recorded in a template field is a text string, the control command contains information about the combination of specific character codes representing the text string in the information related to the image to be recorded in the template field. The recording control unit 32 can therefore use existing text searching technology to determine if recording the string identified by the keyword D9 in a specific area is instructed.

Record R1 thus relationally stores field attribute D8, keyword D9, and execution process D10. As a result, the field attribute D8 defined for each template field can be desirably used to execute a specific process conditionally upon recording a specific string in a template field associated with the specific attribute. In other words, if the string SEATTLE NM 123456789 happens to be in a template field associated with an attribute other than ADDRESS, the condition of record R1 will not be satisfied, and recording the corporate logo where not intended is prevented.

As shown in FIG. 5, the second record R2 in the execution process database 37 stores the following values: template name D1, template T1; field name D2, FIELD A2; field attribute D8, ALL; keyword D9, XX 941X-13; execution process D10, process Q2. Process Q2 is a process that records a linear barcode at a specific position in field A2, and records a two-dimensional barcode at a separate specific position. The content of both barcodes relates to the shipping region identified by the string XX 941X-13.

Record R2 thus means that when the control command instructs recording the string XX 941X-13 in the field of field name D2 in template T1 regardless of the field attribute, process Q2 executes to record a linear barcode and a two-dimensional barcode corresponding to XX 941X-13 at specific positions in the template field. By executing process Q2 triggered by this condition being met, barcodes related to the string XX 941X-13 are recorded in field A2 as shown in field A2 in FIG. 6. The user can then optically read information related to the destination region using a barcode reader, and user convenience is improved. As a result, the printer 3 can dynamically change the image printed in field A2.

In this embodiment a code identifying the region of the package destination is always recorded in field A2. The field attribute D8 in record R2 is therefore set to ALL.

Record R2 thus relationally stores field name D2, keyword D9, and execution process D10. As a result, when recording a specific string in a specific field of a specific template is instructed, a specific process can be executed, and the printout can be dynamically changed based on the relationship between a field defined in the template and the string recorded in the field.

When a control command is received from the host computer 2, the recording control unit 32 interprets the control command, references the execution process database 37, determines if the condition defined by record R2 is met, and if the condition is met, executes process Q2 at the appropriate time.

As shown in FIG. 5, the third record R3 in the execution process database 37 stores the following values: template name D1, template T1; fieldname D2, FIELD A3; field attribute D8, SHIPPING METHOD; keyword D9, XXX GROUND; execution process D10, process Q3. process Q3 is a process that prints a blue background in the template field where the string XXX GROUND is printed.

Record R3 thus means that when the template is template T1, the field name D2 is field A3, the field attribute D8 is SHIPPING METHOD, and the keyword D9 string XXX GROUND is to be recorded, process Q3 is executed to print a blue background in that field. This method enables the user reading the label to know the shipping method logically from information identifying the shipping method as a text string in field A3, and also quickly recognize the shipping method from experience based on the color of the background in field A3. The printer 3 can thus dynamically change the image printed in field A3.

Record R3 thus relationally stores field name D2, field attribute D8, keyword D9, and execution process D10. As a result, the field name D2 and field attribute D8 defined for each template field can be desirably used to execute a specific process conditionally upon recording a specific string in a template field associated with the specific attribute.

When a control command is received from the host computer 2, the recording control unit 32 interprets the control command, references the execution process database 37, determines if the condition defined by record R3 is met, and if the condition is met, executes process Q3 at the appropriate time.

As shown in FIG. 5, the fourth record R4 in the execution process database 37 stores the following values: template name D1, template T1; field name D2, FIELD A5; field attribute D8, RELATED INFORMATION; keyword D9, ZZZ; execution process D10, process Q4. process Q4 is a process that prints a stored image of a specific identification number at a specific position in template field A6.

In this example, to record an image for an advertisement in field A6, a code uniquely identifying the advertisement is recorded as a string in field A5. The stored image recorded by process Q4 is the image related to the advertisement corresponding to the string ZZZ.

Record R4 thus means that when the template is template T1, the field name D2 is field A5, the field attribute D8 is RELATED INFORMATION, and the keyword D9 string ZZZ is to be recorded, process Q4 is executed to record an image of the advertisement corresponding to ZZZ at the specific position in field A6. By executing process Q4 triggered by this condition being met, an appropriate image of the advertisement corresponding to the code printed in field A5 is recorded as shown in field A6. The printer 3 can thus dynamically change the image printed in field A6.

Triggered by the condition that recording a specific string in a specific area is commanded, the printer 3 in this example can execute a specific process related to recording in a template field other than the specified area.

When a control command is received from the host computer 2, the recording control unit 32 interprets the control command, references the execution process database 37, determines if the condition defined by record R4 is met, and executes process Q4 if the condition is met.

Operation of the printer 3 is described next with reference to a flow chart.

Figure 7:
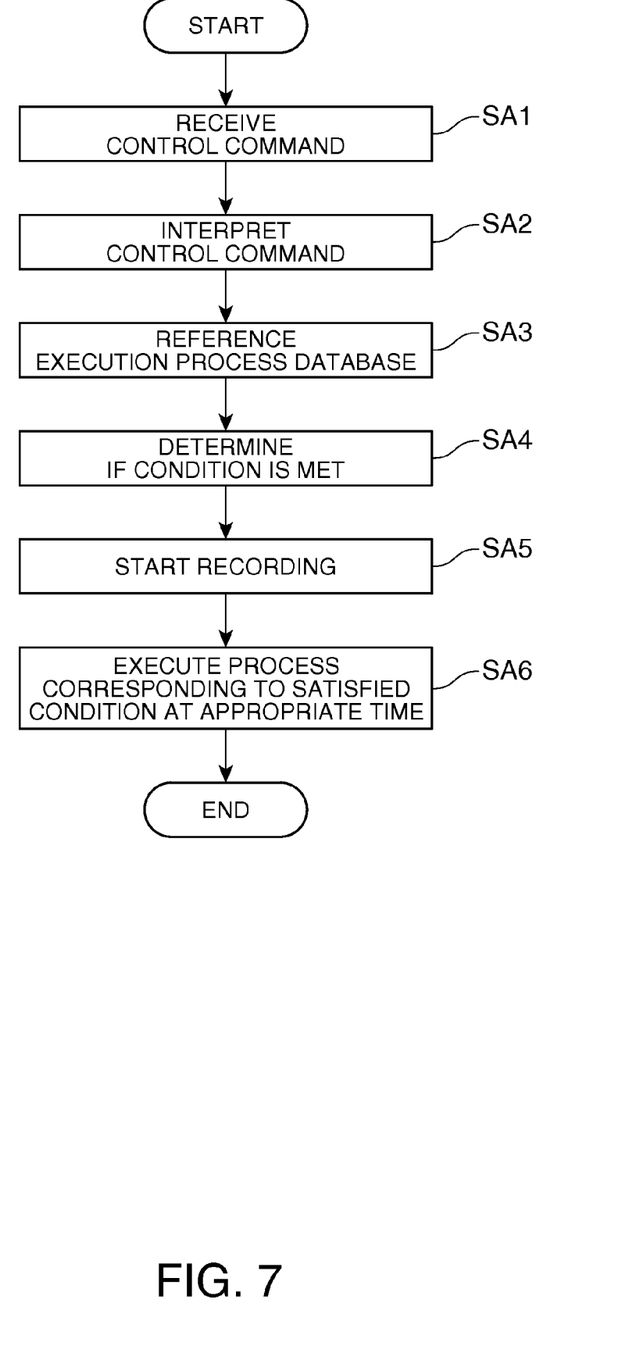
FIG. 7 is a flow chart of printer operation.

FIG. 7 is a flow chart of the operation of the printer 3 when recording images on a label according to a template.

When a control command is received from the host computer 2 (step SA1), the recording control unit 32 of the printer 3 interprets the received control command (step SA2), references the execution process database 37 (step SA3), and determines if any of the conditions defined by the records in the execution process database 37 are met (step SA4). If a condition is met, the recording control unit 32 appropriately schedules the recording processes executed thereafter so that the processes identified by the execution processes D10 related to the satisfied conditions execute at the appropriate times.

The recording control unit 32 then starts recording images according to the template (step SA5). At this time, the recording control unit 32 sequentially executes at appropriate times the processes related to the conditions determined met in step SA4. The output of the recording process can thereby be dynamically changed, and the printout can be dynamically changed for the user's convenience.

The operation of the printer 3 when a particular condition is met is described above, but the operation of the printer 3 is not so limited.

For example, triggered by the condition that recording a specific string in a specific template field (or field with a specific attribute) in a specific template is instructed, the color of the border around a specific area could be changed, the color of specific text could be changed, or a specific string could be added to a specific area. This embodiment enables dynamically changing the printout using the ability to record images based on a template and the ability to print in color.

The content of the execution process database 37 in the foregoing embodiment can be changed, and new records can be created, using a function of a dedicated tool 55 of the template terminal 5. More specifically, the dedicated tool has functions for updating specific information in a specific record of the execution process database 37, and providing a user interface for creating new records, and the user can cause the printer 3 to execute a specific process when a specific condition is met by inputting appropriate information through the user interface. The database could also be updated using a function of the application program 21 and/or device driver 23 of the host computer 2, or a function of printer 3 firmware.

As described above, the printer 3 according to this embodiment of the disclosure can connect to a host computer 2, and has a storage unit 33 for storing a template database 35 defining areas (fields) in the recording area of a label (recording medium) in individual templates, and a recording control unit 32 that records in the areas (fields) defined in a particular template based on a control command received from the host computer 2. When a control command instructing recording a specific string in a specific area of a specific template is received, the recording control unit 32 executes a specific process.

Because the printer 3 executes a specific process when instructed to record a specific string in a specific area of a specific template, the printer 3 can dynamically change the printout according to the relationship between the areas (fields) defined in the template and the strings recorded in the areas. More specifically, the printout can be dynamically changed using the ability to record based on a template.

This embodiment of the disclosure stores an execution process database 37 linking a field name D2 (area identification information) identifying a particular area (field), a keyword D9 (specific string), and an execution process D10 identifying a specific process to be executed when recording the string stored in the keyword D9 in the area identified by the field name D2 is instructed. When a control command is received from the host computer 2, the recording control unit 32 determines if recording the string identified by the keyword D9 in the area identified by the field name D2 is instructed based on the execution process database 37, and if this condition is met, executes the specific process identified by the corresponding execution process D10.

Based on the execution process database 37, the printer 3 according to this embodiment of the disclosure can appropriately determine if recording a specific string in a specific area is instructed, and appropriately execute a specific process based on an appropriate decision.

Note that the execution process database 37 and the template database 35 may be combined in a single database.

By writing ALL to the field name D2 in the execution process database 37, the field attribute D8 (area attribute information) identifying the area attribute is stored instead of the area identification information or together with the field name D2 related to the keyword D9 (specific string) and execution process D10. When a control command is received from the host computer 2, the recording control unit 32 determines based on the execution process database 37 if recording the string identified by the keyword D9 in the area identified by the field name D2 is instructed, or if recording the string identified by the keyword D9 in the area with the attribute indicated by the field attribute D8 is instructed, or if recording the string identified by the keyword D9 in the area identified by the field name D2 and having the attribute indicated by the field attribute D8 is instructed, and if any of these conditions is true, executes the specific process indicated by the corresponding execution process D10.

If an area has a specific attribute, the meaning of the string recorded in that area may differ according to the attribute of the area. This embodiment can therefore dynamically change the printout based on the relationship between the areas defined in the template, the attributes of the areas, and the string recorded in each area. The printout can therefore be dynamically changed using the ability to record based on a template.

Embodiment 2

A second embodiment of the disclosure is described next.

Figure 8A:
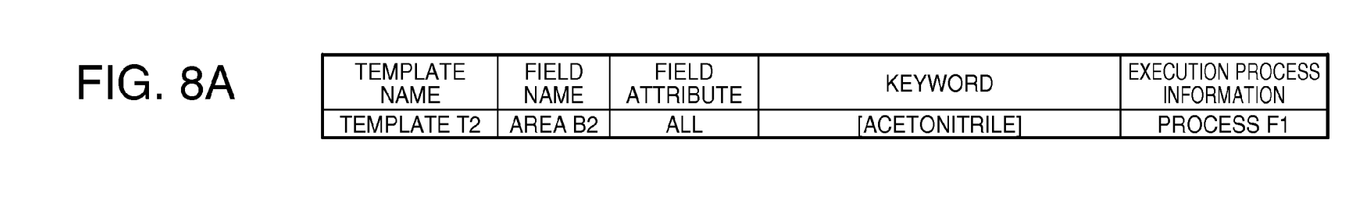
FIGS. 8A and 8B show an example of an image and a template database according to a second embodiment of the disclosure.
Figure 8B:
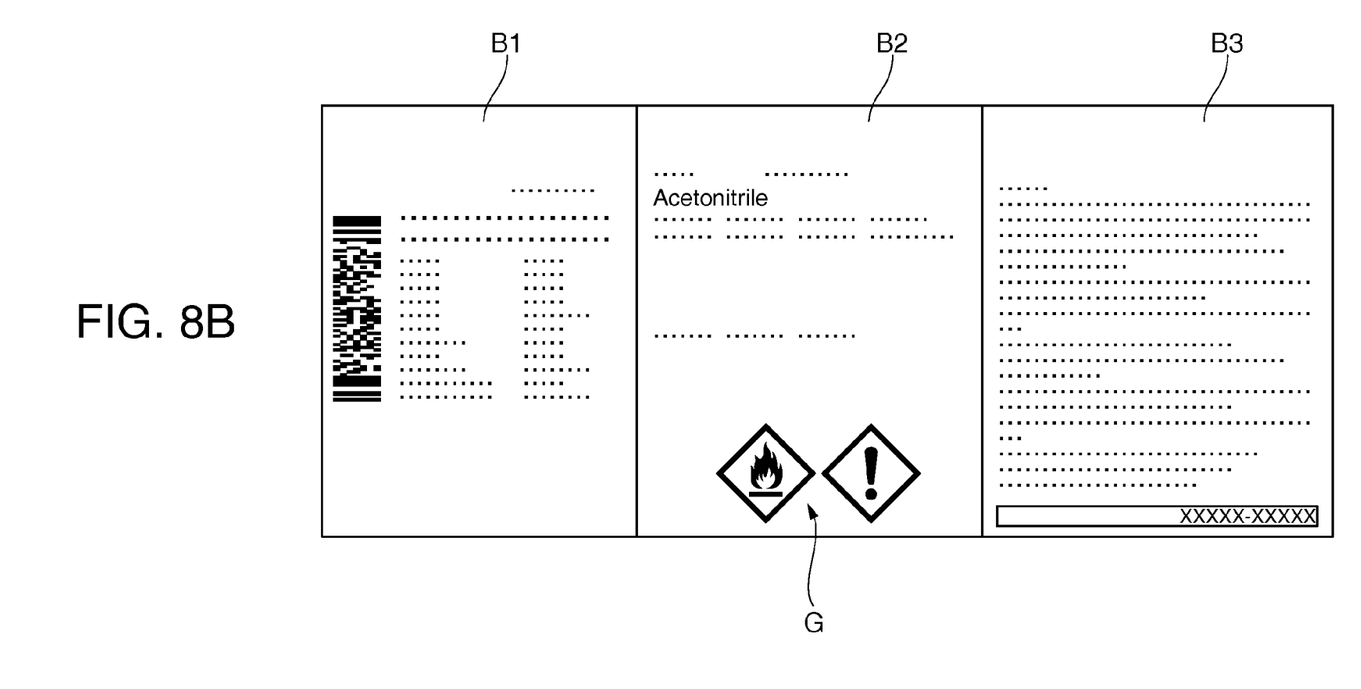

FIG. 8A shows an example of the content of the execution process database 37 according to a second embodiment of the disclosure, and FIG. 8B shows an example of images recorded on a label by the process recorded in the execution process database 37.

FIG. 8B shows images recorded based on template T2. This template T2 is a template used for labels applied to chemical products, and from left to right in the figure has areas (fields) B1, B2, and B3. Of these three areas, area B2 is where the name of the chemical is recorded.

As shown in FIG. 8B, the record in the execution process database 37 according to this embodiment of the disclosure shows that process F1 is executed when triggered by the condition that recording the string "ACETONITRILE" in the area associated with the field name D2 of area B2 in template T2 is instructed is met. Process F1 is a process of recording an image (image G in FIG. 8B) of a user warning triggered by the chemical being acetonitrile.

By recording such a record in the execution process database 37, an image related to the chemical acetonitrile is always recorded on a label for acetonitrile. This prevents accidentally not recording an image related to a hazardous product on a label for a hazardous product due to human error.

Embodiment 3

A third embodiment of the disclosure is described next.

Figure 9A:
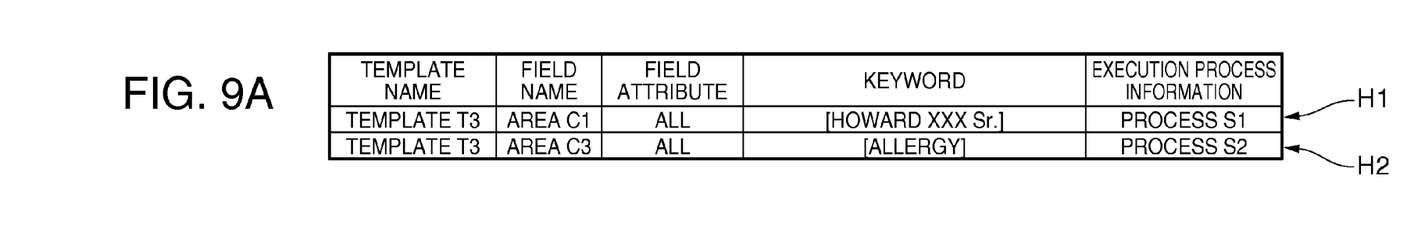
FIGS. 9A and 9B show an example of an image and a template database according to a third embodiment of the disclosure.
Figure 9B:
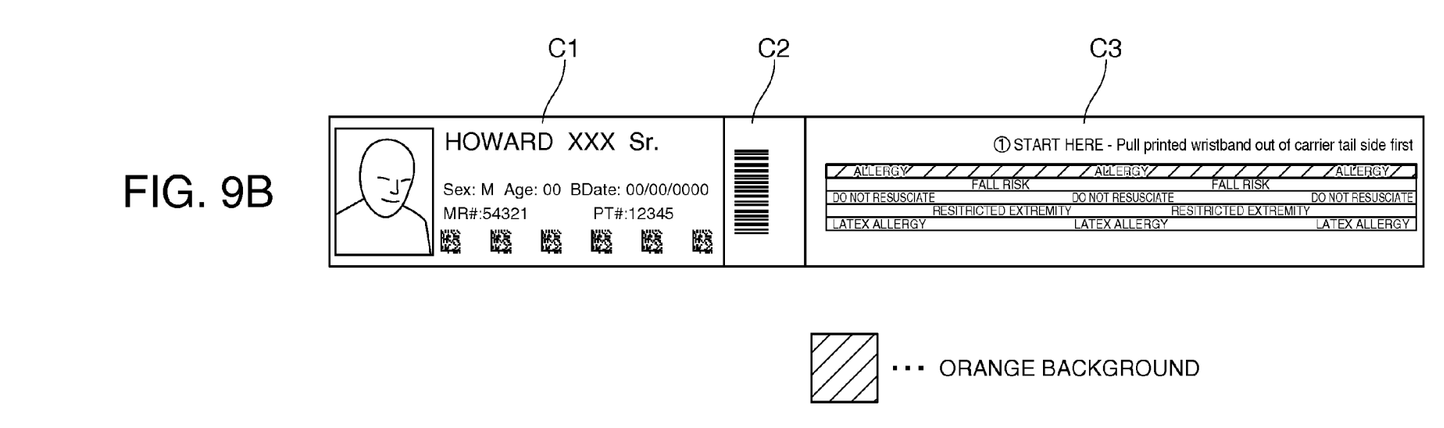

FIG. 9A shows an example of the content of the execution process database 37 according to a third embodiment of the disclosure, and FIG. 9B shows an example of images recorded on a label based on the execution process database 37.

FIG. 9B shows images recorded based on template T3. This template T3 is a template used for labels that are given to patients in a hospital and worn on the patient's wrist, and contains medical information about the patient. Template T3 has three areas (fields) C1, C2, and C3 from left to right. Area C1 contains the patient name, sex, and other personal information. Area C3 is where essential medical information, including warnings, about the patient is printed.

As shown in FIG. 9A, the first record H1 in the execution process database 37 according to this embodiment of the disclosure means that process S1 is executed triggered by the condition that recording the string HOWARD XXX Sr. in the area in template T3 associated with the field name D2 AREA C1 is instructed being met.

Process S1 is a process of recording a previously stored picture of the patient HOWARD XXX Sr. at a specific position in area C1. As a result, a picture of the patient's face is automatically recorded in area C1. The stored image (picture) does not necessarily need to be stored in the printer 3, and could be stored on a server connected to the network 4, and retrieved from the server using the string stored in the keyword D9 field as the search key.

The second record H2 in the execution process database 37 means that process S2 is executed triggered by the condition that recording the string ALLERGY in the area in template T3 associated with the field name D2 AREA C3 is instructed being met. Process S2 is a process of filling a band corresponding to the string ALLERGY with the color orange. An orange band is thus created where the string ALLERGY is recorded as shown in FIG. 9B, and by simply seeing this orange band in area C3, the user immediately knows that the patient has an allergy.

The disclosure is described above with reference to preferred embodiments thereof, but the disclosure is not limited thereto and can be modified and adapted in many ways without departing from the scope of the accompanying claims.

For example, the foregoing embodiments are described using specific examples of conditions for executing specific processes, but these are simply examples. More specifically, any desirable conditions based on the areas (template fields) and strings to be recorded in the areas (template fields) can be used.

The function blocks shown in FIG. 1 can be achieved by the cooperation of hardware and software, and do not suggest a specific hardware configuration.

The devices can also perform the operations by means of the control units running a program stored on externally connected storage media. The program may be stored on any appropriate storage medium, including hard disk drive, optical disc, magneto-optical disc, silicon disk, and flash memory.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A recording device that can connect to a control device, the recording device comprising:
   a storage unit that stores template data defining areas formed in the recording area of a recording medium based on a template;
   a recording control unit that, when a control command specifying a specific template and instructing recording in a specific area is received from the control device, records in the area based on the template data related to the specific template,
      executes a specific process when a control command specifying recording a specific string in a specific area of a specific template is received,
   execution process data relating area identification information specifying an area, a specific string, and execution process information identifying a specific process to execute when recording a specific string in an area identified by the area identification information is instructed is stored in the storage unit;
   when a control command is received from the control device, the recording control unit determines based on the execution process data if recording a specific string in the area identified by the area identification information is instructed, and if said recording is instructed, executes the specific process indicated by the corresponding execution process information
   area attribute information indicating an attribute of an area is related instead of the area identification information or in addition to the area identification information to the specific string and execution process information in the execution process data; and
   the recording control unit determines, based on the execution process data when a control command is received from the control device, if recording a specific string in the area identified by the area identification information is instructed,
      if recording a specific string in the area with the attribute indicated by the area attribute information is instructed, or
      if recording a specific string in the area that is identified by the area identification information and has the attribute indicated by the area attribute information is instructed, and
      if recording a specific string is instructed, executes the specific process indicated by the related execution process information.

2. The recording device described in claim 1, wherein:
   the specific process is at least one of a process that changes the color of a border around the specific area, a process that changes the color of the background of the specific area, a process that changes the color of the specific string, a process that adds a specific image to the specific area, a process that adds a specific string to the specific area, and a process that makes a specific part of the specific area a specific color.

3. A control method of a recording device that can connect to a control device, comprising steps of:
   storing template data defining areas formed in the recording area of a recording medium based on a template;
   recording in the specific area based on the template data related to the specific template when a control command specifying a specific template and instructing recording in a specific area is received from the control device;
   executing a specific process when recording a specific string in a specific area of a specific template is instructed,
   storing execution process data relating area identification information specifying an area, a specific string, and execution process information identifying a specific process to execute when recording a specific string in an area identified by the area identification information is instructed;
   when a control command is received from the control device, determining based on the execution process data if recording a specific string in the area identified by the area identification information is instructed, and if said recording is instructed, executing the specific process indicated by the corresponding execution process information
   area attribute information indicating an attribute of an area is related instead of the area identification information or in addition to the area identification information to the specific string and execution process information in the execution process data and
   determining, based on the execution process data when a control command is received from the control device, if recording a specific string in the area identified by the area identification information is instructed,
      if recording a specific string in the area with the attribute indicated by the area attribute information is instructed, or
      if recording a specific string in the area that is identified by the area identification information and has the attribute indicated by the area attribute information is instructed; and
   if recording a specific string is instructed, executing the specific process indicated by the related execution process information.

4. The control method of a recording device described in claim 3, wherein:
   the specific process is at least one of a process that changes the color of a border around the specific area, a process that changes the color of the background of the specific area, a process that changes the color of the specific string, a process that adds a specific image to the specific area, a process that adds a specific string to the specific area, and a process that makes a specific part of the specific area a specific color.

5. A non-transitory computer readable medium in which a computer program executed by a control unit controls a recording device that can connect to a control device and has a storage unit that stores template data defining areas formed in the recording area of a recording medium based on a template, the program causing the control unit to execute the steps of:

recording in the specific area based on the template data related to the specific template when a control command specifying a specific template and instructing recording in a specific area is received from the control device; and     executing a specific process when recording a specific string in a specific area of a specific template is instructed; and     storing execution process data relating area identification information specifying an area, a specific string, and execution process information identifying a specific process to execute when recording a specific string in an area identified by the area identification information is instructed; and     when a control command is received from the control device, determining based on the execution process data if recording a specific string in the area identified by the area identification information is instructed, and if said recording is instructed, executing the specific process indicated by the corresponding execution process information     area attribute information indicating an attribute of an area is related instead of the area identification information or in addition to the area identification information to the specific string and execution process information in the execution process data; and     determining, based on the execution process data when a control command is received from the control device, if recording a specific string in the area identified by the area identification information is instructed,         if recording a specific string in the area with the attribute indicated by the area attribute information is instructed, or if recording a specific string in the area that is identified by the area identification information and has the attribute indicated by the area attribute information is instructed; and     if recording a specific string is instructed, executing the specific process indicated by the related execution process information.

\* \* \* \* \*